United States Patent Office 3,184,466
Patented May 18, 1965

3,184,466
N-BETA AMINO BUTYRYL-INDOLINES
Ingeborg Hennig, Kelkheim, Taunus, and Ernst Lindner, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 15, 1961, Ser. No. 131,475
Claims priority, application Germany, Aug. 19, 1960, F 31,914
6 Claims. (Cl. 260—294)

The present invention relates to novel indoline derivatives of the following Formula I

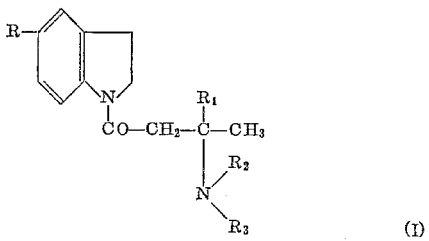

wherein R stands for a hydrogen atom or a halogen atom, $R_1$ represents a hydrogen atom or the methyl group, and $R_2$ and $R_3$ represent hydrogen atoms or alkyl groups having 1 to 4 carbon atoms, or are, together with the nitrogen atom, members of an indoline ring which may be halogenated in 5-position, or of a saturated 5- or 6-membered heterocyclic ring.

The invention relates also to the preparation of indoline derivatives of the indicated formula which is carried through according to methods which are generally used for the manufacture of said compounds. It is possible, for example, to introduce, in 1-position and if desired stepwise, into an indoline derivative of the following Formula II

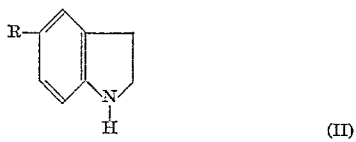

wherein R has meaning given above, a carboxylic acid radical of the following Formula III

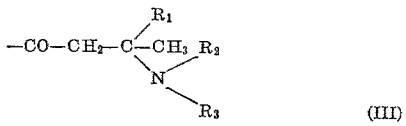

in which $R_1$, $R_2$, and $R_3$ have the meanings given above; or a compound of Formula I, in which R stands for a hydrogen atom can be halogenated in 5-position. The compounds of the above Formula I obtained, can be transformed with inorganic or organic acids into the corresponding salts.

The products of the present invention and the salts thereof have valuable therapeutic properties and are especially distinguished by a good sympathicolytic action and a high ability to lower the blood pressure for a long period of time. They may be contained as active agents in pharmaceutical compositions suitable for oral and parenteral application.

According to a preferred variant of the process of the invention there is introduced, for example, at the nitrogen atom, of the indolines used as starting materials a carboxylic acid radical which can be transformed into a butyric acid radical of Formula III carrying a basic substituent in β-position. Besides indoline there can be used as starting substances, for example, the following 5-halogenoindolines: 5-chloroindoline, 5-fluoroindoline and 5-bromoindoline. The indoline derivatives halogenated in 5-position can be prepared, for example, by the method described in J. Org. Chemistry 20 (1955), page 1538, by halogenating 1-acyl-indolines. 5-fluoroindoline can be made from 5-fluoroindole by catalytic hydrogenation.

For the introduction of carboxylic acid radicals of Formula III there are suitable, for example, unsaturated carboxylic acids such as crotonic acid or β,β-dimethylacrylic acid or the reactive derivatives thereof, for example, the corresponding esters of said acids with low molecular weight aliphatic alcohols or phenols, as well as the acid halides. It is of advantage to use the acid chlorides of the aforesaid carboxylic acids, which are reacted in usual manner with the indoline derivatives mentioned as starting substances. The reaction is advantageously performed in the presence of an inert organic solvent, such as ether, benzene, methylene chloride or chloroform. In order to bind the hydrogen halide set free it is suitable to add the equivalent amount of a tertiary organic base, for example pyridine or triethylamine, or to add double the equivalent amount of the indoline derivative used as reaction component. In most cases, the reaction of the acid chlorides with the indolines takes place spontaneously and it is practically quantitative. The reaction product is isolated in usual manner, for example, the aminohydrochloride formed is filtered off with suction and the filtrate is concentrated. In most cases, the crotonyl-indoline derivative can be directly obtained from the filtrate in crystalline form.

Instead of the acid chlorides there can likewise be used the free acids or the low molecular weight alkyl esters thereof, for example the methyl or ethyl esters, which are allowed to react with the indoline derivatives either for some hours at high temperatures (about 100 to 150° C.) or for a prolonged period of time, for example, several days, at room temperature. In general, in the reaction with free unsaturated carboxylic acids or the esters thereof the indoline derivative adds at least partially to the double bond of the crotonyl radical, so that 1-[β-indolino-butyryl]-indolines as well as 1-crotonyl-indolines can be obtained.

In a further working step the unsaturated intermediates thus obtained can be converted into the desired acylindolines carrying basic substituents. It is possible, for example, to heat the intermediates for some time at refluxing temperature with an amine of the following Formula IV

wherein $R_2$ and $R_3$ have the meanings given above, if desired in aqueous solution or in the presence of organic solvents, such as benzene, xylene, toluene, or in the absence of solvents. In some cases, it is advantageous to carry out the reaction in an autoclave and to allow the unsaturated acyl-indolines to stand with the desired amines for some days. As amines of the above Formula IV there can be used, for example, ammonia, methylamine, dimethylamine, ethylamine, diethylamine, n-propylamine, isopropylamine, n-butylamine, di-n-propylamine, di-n-butylamine, tertiary butylamine, diisobutylamine, pyrrolidine, piperidine, alkyl-piperidines such as 2-, 3-, or 4-methylpiperidine, morpholine, indoline, 5-chloroindoline, or 5-bromoindoline. The products obtained are isolated in usual manner, for example by concentrating the reaction mixture under reduced pressure and isolating the desired basic products by means of dilute acids. In many cases the residue obtained after the concentration can be directly treated with alcoholic hydrochloric acid, whereby the corresponding hydrochlorides of the products of the invention are formed.

According to a further variant of the process for introducing a carboxylic acid radical of Formula III the indolines used as starting substances are reacted with halogenocarboxylic acids or the functional reactive derivatives thereof and the 1-(β-halogenoacyl)-indoline derivatives obtained as intermediates are treated with the aforementioned amines of Formula IV for preparing the products of the invention. Suitable halogenocarboxylic acids are β-chlorobutyric acid, β-bromo-butyric acid, β-iodo-butyric acid, β-chloro-isovaleric acid, β-bromo- or β-iod-isovaleric acid. As functional derivatives of said halogenocarboxylic acids there are advantageously used the corresponding chlorides or bromides of said acids. However, it is likewise possible to use the low molecular weight alkyl esters of said acids, for example the methyl or ethyl esters. The 1-(β-halogenoacyl)-indolines can be prepared in the same manner as the reaction products of the unsaturated carboxylic acids or the functional derivatives thereof with the indolines. Still further, 1-(β-halogenoacyl)-indolines can be prepared by halogenating 1-(β-hydroxy-acyl)-indolines or by additively combining hydrogen halide with 1-crotonyl- or 1-(β-methyl-crotonyl)-indoline. The 1-(β-halogenoacyl)-indolines can be converted in usual manner into the desired products of the invention by reacting them with the aforementioned amines of Formula IV. This reaction can be carried out under the conditions set forth above for the reaction of amines with unsaturated acylindolines.

A further variant of the process of the invention for the manufacture of basically substituted butyryl-indolines consists in reaction indoline or 5-halogenoindolines with diketene, the corresponding 1-(acetoacetyl)-indoline being formed as intermediate. This reaction is carried out in usual manner, for example by dropping diketene into the respective indoline derivative, which is suitably dissolved in an inert solvent. As solvents there can be used, for example, benzene, toluene, chloroform, or methylene chloride. It is of advantage to perform this reaction with agitation and at a temperature in the range from 10 to 50° C. In many cases it is necessary to cool. The reaction being complete, the reaction mixture is concentrated under reduced pressure and the crude acetoacetyl-indoline obtained is directly subjected to further treatment. The acetoacetyl-indoline derivative is either reduced directly in the presence of an amine of the above Formula IV or it is a first condensed with an amine of Formula IV and the condensation product is reduced in a further working step. When ammonia is used as reaction component, it is suitable to react an alcohol solution saturated with gaseous ammonia in the cold with the alcoholic solution of 1-acetoacetyl-indoline and to reduce the reaction mixture according to the usual methods.

The reduction can be carried out, for example, with hydrogen in the nascent state, for example with aluminum amalgam, in the presence of a solvent. Suitable solvents are, for example, low molecular weight aliphatic alcohols, if desired in admixture with water. It is of advantage to work at moderately elevated temperature, preferably at the boiling temperature of the solvent used. The reduction can likewise be carried out with sodium boron hydride.

Still further, the reduction can be realized catalytically, suitable catalysts being the metals of group 8 of the Periodic Table, for example nickel, preferably in the form of the known Raney catalysts. Temperatures in the range from 50 to 70° C. are advantageously applied.

The catalytic hydrogenation in the presence of amines is especially suitable for acetoacetyl-indoline and less suitable for 1-acetoacetyl-5-chloroindoline and 1-acetoacetyl-5-bromoindoline, since in this form of hydrogenation the halogen atom is easily split off. In case 1-acetoacetyl-5-chloroindoline is used, the splitting off of chlorine can be avoided when the hydrogenation is carried out at moderately elevated temperature only, preferably at about 60° C. The reaction mixture is worked up in usual manner. To this end the catalyst is separated, the reaction mixture is concentrated and the basic reaction product is separated from the residue by means of dilute acids.

In a further embodiment of the process of the invention basically substituted 1-acylindolines are used as starting material. These compounds are chlorinated or brominated in 5-position. The 5-bromo-derivative is prepared, for example, by adding bromine or brominating reagents, such as N-bromo-succinimide or dioxane-dibromide, to the basically substituted 1-acylindoline, which is advantageously used in the form of an appropriate salt, preferably in the presence of a suitable solvent. As solvents there can be used such substances as are generally employed in brominating reactions, for example, glacial acetic acid, methylene chloride or chloroform. It is of advantage to operate under mild reaction conditions. The bromination being complete, the reaction mixture is poured on to ice, whereby the 1-acyl-5-bromoindoline formed separates as a free base or in the form of its sparingly soluble hydrobromide. The reaction product is worked up in usual manner, for example filtered off with suction and converted, if necessary, into the free base by means of alkali metal hydroxide solutions, or extracted with dilute hydrochloric acid.

The products of the invention are basically reacting compounds which may be transformed into the corresponding salts with the aid of physiologically tolerable inorganic or organic acids. In many cases the salts are readily soluble in water. Suitable inorganic acids are, for example, hydrohalic acids such as hydrochloric acid and hydrobromic acid, sulfuric acid, phosphoric acid and amidosulfonic acid. As organic acids there are mentioned by way of example formic acid, acetic acid, propionic acid, lactic acid, maleic acid, succinic acid, tartaric acid, benzoic acid, salicylic acid, citric aid, aceturic acid, hydroxyethane sulfonic acid, and ethylenediamine-tetr-acetic acid.

The products of the invention represent valuable medicaments which are especially distinguished by their sympathicolytic properties, by a distinct antagonistic effect on 5-hydroxytryptamine, and by the ability to lower the blood pressure for a prolonged period of time already when administered in small doses. Thus, for example, a dosage of 200γ/kg. i.v. of 1-(β-ethylamino-β-methylbutryl)-indoline gradually reduced, in the narcotized cat, the blood pressure by about 20 mm. of mercury. 50 minutes after the injection the reduction of the blood pressure was not yet compensated. 1 mg./kg. of the compound administered intravenously reduced the blood pressure for a prolonged period of time from 115 to 75 mm. of mercury.

The antagonistic effect of the products of the invention on 5-hydroxy-tryptamine was determined according to the prescription of Wolley. 50 mg./kg. of 5-hydroxy-tryptophane, which is the bioligoical primary product of 5-hydroxy-tryptamine was injected intraperitioneally into mice, whereby a laxative effect was obtained after 7 to 8 minutes on the average.

When, however, one of the novel products of the invention, for example 30 mg./kg. of 1-(β-ethylamino-β-methyl-butyryl)-indoline, was injected intravenously into mice, the laxative effect completely failed to appear in 5 to 6 animals; 20 mg./kg. i.v. retarded the laxative effect by about 7 to 8 minutes.

Moreover, the products of the invention tested with a narcotized cat have a distinct antagonistic effect on adrenaline. A dosage of 200γ/kg. i.v. of 1-(β-ethylamino-β-methylbutyryl)-indoline slightly reduced, for example, the adrenaline effect, which corresponded approximately to the effect obtained after the intravenous administration of 100γ/kg. of the known 2-[N-p-tolyl-N-(m-hydroxyphenyl)-aminomethyl]-imidazolidine. 1 mg./kg. of the product of the inveniton administered intravenously fully compensated the pressor effect of small doses of adrenaline and strongly reduced the effect of large doses or adrenaline. The effect of 3γ of adrenaline was reduced by 90%, for example, by the indicated dose.

As compared with the described pharmacological effect of very small doses the toxicity of the products of the invention is relatively small. For example, in the case of the aforesaid product of the invention the minimum lethal dose in the mouse is 40 mg./kg. i.v.

The products of the invention can be administered in free form or in the form of their salts, either parenterally or orally. For parenteral administration there are especially suitable sterile aqueous solutions, for example in ampules containing 5 to 50 mg. of active substance per cubic centimeter of liquid. For oral administration there are especially suitable tablets or dragées which contain, in addition to the products of the invention, the usual inert auxiliaries and carriers, such as talcum, milk sugar, tragacanth, magnesium stearate and various types of starch, for example amylum tritici, amylum solani or amylum orizae. A tablet may contain 5 to 50 mg. of active substance.

The following examples serve to illustrate the invention, but they are not intended to limit it thereto.

EXAMPLE 1

*1-[β-ethylaminobutyryl]-indoline*

(a) 10.5 grams of diketene dissolved in 20 cc. of benzene were added dropwise at 5 to 10° C. while mechanically stirring to 15 grams of indoline dissolved in 100 cc. of benzene. After having stirred for a further hour, the reaction mixture was concentrated under reduced pressure. The solid residue, which consisted of 1-acetoacetyl-indoline, was recrystallized from ethyl acetate. The produce had a melting point of 62 to 63° C. The residue could likewise be further processed as crude product.

8 grams of 1-acetoacetyl-indoline were boiled with reflux for 8 hours with 50 cc. of ethanol, 50 cc. of aqueous ethylamine of 50% strength and 8 grams of amalgamated aluminum. After having cooled, the residue was filtered off with suction, washed with alcohol and the filtrate, combined with the washing liquid, was concentrated under reduced pressure. 8.5 grams of a solid colorless product were obtained. After the addition of the calculated amount of 1 N hydrochloric acid, the solution was fitered with the addition of charcoal and the filtrate was concentrated under reduced pressure. The syrupy residue crystallized after having been triturated with acetone. The reaction product was recrystallized from ethanol. 6 grams of 1-[β-ethylaminobutyryl]-indoline hydrochloride were obtained having a melting point of 156 to 157° C.

The same compound was prepared by the methods described sub (b), (c) and (d).

(b) 10 grams of crotonyl chloride dissolved in 100 cc. of ether was added dropwise at 10 to 20° C. while mechanically stirring to 24 grams of indoline dissolved in 250 cc. of ether. After having stirred for a further hour, the indoline hydrochloride obtained was filtered off with suction, thoroughly washed with ether and the combined ether solutions were shaken with saturated sodium chloride solution. After having dried the ether solution with sodium sulfate and concentrated, 20 grams of a solid residue were obtained. The residue was recrystallized from ethyl acetate and the 1-crotonylindoline was obtained having a melting point of 101 to 102° C. 4 grams of 1 crotonylindoline were heated for 5 hours on the steam bath with 50 cc. of aqueous ethylamine solution of 50% strength. After having concentrated under reduced pressure, a solid residue was obtained which melted at 55 to 56° C. after recrystallization from ethyl acetate. After the adidtion of alcoholic hydrochloric acid the 1-[β-ethylaminobutyryl]-indoline hydrochloride was obtained having a melting point of 156° C.

(c) 5 cc. of aqueous ethylamine solution of 50% strength and 50 cc. of methanol were added to 5 g. of 1-acetoacetylindoline. 0.5 gram of sodium boron hydride was introduced in portions into the solution obtained. The reaction mixture was heated for 30 minutes on the steam bath. The reaction being complete, the whole was concentrated, the residue was admixed with about 100 cc. of water and shaken with ether. After having dried and distilled off the ether and added the calculated amount of alcoholic hydrochloric acid there were obtained 4 grams of 1-[β-ethylaminobutyryl]-indoline hydrochloride having a melting point of 156 to 157° C. when recrystallized from a mixture of ethanol and ether.

(d) 10 cc. of aqueous ethylamine solution of 50% strength were added to 10 grams of 1-acetoacetylindoline prepared as described sub (a) and the whole was heated for some minutes on the steam bath. On cooling the turbid solution solidified to a crystalline magma consisting of 1-[β-ethylamino-crotonyl]-indoline which melted at 117 to 118° C. after recrystallization from ethanol.

10 grams of said compound were hydrogenated in methanol at 80° C. and under a pressure of 100 atmospheres gauge in the presence of Raney nickel. After having filtered off the catalyst and concentrated the filtrate, 10 grams of a solid residue were obtained. The residue was treated with 50 cc. of 2 N hydrochloric acid on the steam bath and the undissolved 1-butyryl-indoline was filtered off with suction. The acid filtrate was purified with charcoal and rendered alkaline with dilute sodium hydroxide solution. The alkaline solution was extracted with ethyl acetate, the ethyl acetate was dried and distilled off. About 2 grams of 1-[β-ethylaminobutyryl]-indoline were obtained in the form of an oily product. The compound was transformed with alcoholic hydrochloric acid into the hydrochloride which crystallized after the addition of ether and melted at 156 to 157° C. after recrystallization from a mixture of ethanol and ether.

EXAMPLE 2

*1-[β-n-butylaminobutyryl]-indoline*

5 grams of 1-crotonylindoline and 40 cc. of n-butylamine were reacted as described in Example 1(b). 6 grams of 1-[β-n-butylaminobutyryl]-indoline were obtained in the form of an oil. After the addition of the calculated amount of 2 N hydrochloric acid a white crystalline magma was formed. The solid residue was recrystallized from ethanol of 80% strength. The 1-[β-n-butylaminobutyryl]-indoline hydrochloride obtained had a melting point of 153 to 154° C.

EXAMPLE 3

*1-[β-piperidinobutyryl]-indoline*

5 grams of crotonylindoline were reacted with 20 cc. of piperidine as described in Example 1(b). 6 grams of crystalline 1-[β-piperidinobutyryl]-indoline were obtained which was transformed into the corresponding hydrochloride by means of alcoholic hydrochloric acid. After having recrystallized from ethanol the hydrochloride melted at 190 to 192° C.

EXAMPLE 4

*1-[β-dimethylaminobutyryl]-indoline*

5 grams of crotonylindoline were reacted with 40 cc. of aqueous dimethylamine solution of 40% strength as described in Example 1(b). After the addition of the calculated amount of maleic acid dissolved in ethanol, 7 grams of 1-[β-dimethylaminobutyryl]-indoline maleate were obtained having a melting point of 115 to 116° C.

EXAMPLE 5

*1-[β-ethylaminobutyryl]-5-fluoroindoline*

10 grams of 5-fluoroindole in 400 cc. of methanol were catalytically hydrogenated at 80° C. and under 140 atmospheres gauge in the presence of Raney nickel. After having filtered the catalyst and concentrated the filtrate, the residue was digested with 2 N hydrochloric acid on the steam bath. The hydrochloric acid solution was filtered off and an excess of dilute sodium hydroxide solution was added to the filtrate. The alkaline aqueous solution was extracted with ether, the ethereal solution was dried with sodium sulfate and concentrated under reduced pressure. 3 grams of an oily residue were obtained (5-fluoroindoline) which was further processed without purification. 20 cc. of ether were added to the residue and, while stirring and cooling, a solution of 3 grams of crotonyl chloride in 10 cc. of ether was dropped in. After having stirred for a short while, water and ether were added to the reaction mixture and the layers were separated. The aqueous layer was admixed with sodium bicarbonate and again extracted with ether. After having dried and concentrated the combined ethereal solutions, 3 grams of a solid residue of 1-crotonyl-5-fluoroindoline were obtained. A little methanol was added to the residue and the whole was boiled for 3½ hours with reflux together with 20 cc. of aqueous ethylamine of 50% strength. After having concentrated under reduced pressure, the oily base was admixed with the calculated amount of 2 N hydrochloric acid. Charcoal was added, the solution was filtered and rendered alkaline with 2 N sodium hydroxide solution. The alkaline solution was extracted with ether, the ether was dried and distilled off. 2.5 grams of 1-[β-ethylaminobutyryl]-5-fluoroindoline were obtained in the form of a solid residue. To the residue there was added a solution of 1.2 grams of maleic acid dissolved in 10 cc. of alcohol and a little ether whereupon the crystalline maleate of the base was obtained. After having recrystallized from a mixture of ethanol and ether, the product had a melting point of 123 to 124° C.

EXAMPLE 6

*1-[β-methyl-β-(ethylamino)-butyryl]-indoline*

(a) 12 grams of β-methyl-crotonyl chloride dissolved in 400 cc. of ether were added dropwise at 10 to 20° C. while mechanically stirring to 24 grams of indoline in 30 cc. of ether. After having stirred for a further hour, the indoline hydrochloride was filtered off with suction, the ethereal solution was washed with saturated sodium chloride solution, dried with sodium sulfate and concentrated. A solid residue was obtained which was recrystallized from ethyl acetate. 13.5 grams of 1-[β-methylcrotonyl]-indoline were obtained melting at 86 to 87° C.

4 grams of said compound were heated for 4 hours on a steam bath with 40 cc. of aqueous ethylamine solution of 50% strength. The reaction mixture was worked up as described in Example 1(b) and 3 grams of 1-[β-methyl-β-(ethylamino)-butyryl] - indoline hydrochloride were obtained melting at 198 to 199° C.

(b) The same compound was also prepared in the following manner:

A solution of 4.8 grams of indoline in 20 cc. of ether was added dropwise at 10 to 20° C. to 4 grams of β-bromo-isovaleric acid chloride (prepared from β-bromo-isovaleric acid and phosphorus trichloride, boiling point 70 to 90° C. under 16 mm. of mercury) in 50 cc. of ether. After having stirred for a further hour, the indoline hydrochloride was filtered off with suction, the ethereal solution was washed with little water, dried and concentrated. The residue (5.5 grams) was heated on a steam bath in the crude state with 15 cc. of aqueous ethylamine of 50% strength and the hot reaction mixture was dissolved in 5 cc. of ethanol. After having boiled for 4 hours with reflux, the mixture was concentrated under reduced pressure. 7 grams of a solid residue were obtained which was treated with 50 cc. of 2 N hydrochloric acid. A small amount of undissolved matter was separated by suction filtration, the solution was filtered with the addition of charcoal and the filtrate was rendered alkaline with 2 N sodium hydroxide solution. After having extracted with ether, dried and concentrated the ether, the residue (about 6 grams) was converted in usual manner into the hydrochloride. 6 grams of 1-[β-methyl-(β-ethylamino)-butyryl] - indoline hydrochloride were obtained having a melting point of 197 to 198° C. A sample of the substance did not show a melting point depression with the compound prepared as described in Example 6(a).

EXAMPLE 7

*1-[β-indolinobutyryl]-indoline*

11.9 grams of indoline and 9 grams of crotonic acid were heated for 3 hours at 160° C. After having been allowed to stand overnight at room temperature, the viscous dark oil obtained was treated with dilute sodium hydroxide solution and extracted with ethyl acetate. The ethyl acetate solution (solution I) was extracted repeatedly with dilute hydrochloric acid. The aqueous acid solution was clarified with charcoal, rendered alkaline with dilute sodium hydroxide solution and extracted again by shaking with ethyl acetate (solution II). After having dried the ethyl acetate solution II with sodium sulfate and concentrated, 9.5 grams of a semi-solid residue were obtained which crystallized after trituration with cold ethyl acetate. The calculated amount of alcoholic hydrochloric acid was added to the hot alcoholic solution of the residue. After the addition of a little ether, the crystalline 1-[β-indolinobutyryl]-indoline hydrochloride was obtained having a melting point of 166° C. (after recrystallization from ethanol). When the ethyl acetate solution I was dried and the solution was concentrated there were obtained about 2 grams of 1-crotonyl-indoline having a melting point of 100 to 101° C.

EXAMPLE 8

*1-[β-methyl-β-(ethylamino)-butyryl]-5-bromoindoline*

50 grams of 1-acetyl-5-bromoindoline were boiled for 3 hours with reflux with 30 cc. of ethanol and 200 cc. of 6 N hydrochloric acid. After the addition of 300 cc. of water, the nearly limpid solution was filtered and rendered alkaline with dilute ammonia. The separated oil was extracted with ether. After having dried and distilled off the ether, 31 grams of crystalline 5-bromoindoline were obtained which melted at 40° C. after having been recrystallized from ethanol.

A solution of 20 grams of 5-bromoindoline and 10 grams of triethylamine in 100 cc. of ether was added dropwise, while stirring, to a solution of 11.8 grams of β-methylcrotonyl chloride in 200 cc. of ether. After having stirred for a further hour, filtered off the hydrochloride with suction, washed the ethereal solution with saturated sodium chloride solution, dried and concentrated, 24 grams of 1-[β-methyl-crotonyl]-5-bromoindoline were obtained melting at 117 to 118° C.

8 grams of the crotonyl compound were heated for 6 hours with reflux with 80 cc. of aqueous ethylamine solution of 50% strength and 100 cc. of methanol. After having worked up as described in Example 1(b), the 1-[β-methyl-β-(ethylamino) - butyryl]-5-bromoindoline hydrochloride was obtained having a melting point of 214 to 215° C.

EXAMPLE 9

*1-[β-methyl-β-(ethylamino)-butyryl]-5-bromoindoline*

4.5 grams of 1-[β-ethylamino-β-methyl-butyryl]-indoline hydrochloride (prepared as described in Example 6) were dissolved in 45 cc. of glacial acetic acid and 1.5 cc. of bromine were added dropwise. 5 minutes after the completion of the bromination, the turbid solution was poured into 250 cc. of ice water and decolorized with sodium bisulfite solution. The separated oil solidified after a short while. After having filtered off with suction, 4.5 grams of the precipitate were treated in the hot with 70 cc. of dilute hydrochloric acid, whereby substantial dissolution occurred. After having filtered off with suction the sparingly soluble portion and cooled the filtrate, the crystalline 1-[β-methyl-β-(ethylamino)-butyryl]-5-bromoindoline hydrochloride was obtained having a melting point of 214 to 215° C. A sample of the product did not show a melting point depression with the compound prepared as described in Example 8.

EXAMPLE 10

*1-[β-morpholinobutyryl]-indoline*

5 grams of 1-crotonylindoline and 2.2 grams of morpholine were boiled for 3 hours at refluxing temperature. After having cooled the solid reaction mixture, it was dissolved in 2 N hydrochloric acid and the undissolved constituents were filtered off with suction. An excess of sodium hydroxide solution was added to the hydrochloric acid solution obtained and the 1-[β-morpholinobutyryl]-indoline, which precipitated in the form of crystals, was filtered off with suction. After having been recrystallized from ethyl acetate the product had a melting point of 84° C. The hydrochloride (obtained by adding alcoholic hydrochloric acid) melted at 195 to 196° C. (when recrystallized from ethanol).

EXAMPLE 11

*1-[β-pyrrolidinobutyryl]-indoline*

5 grams of crotonylindoline and 2 grams of pyrrolidine were reacted as described in Example 10. 6 grams of 1-[β-pyrrolidinobutyryl]-indoline hydrochloride were obtained having a melting point of 167 to 169° C.

EXAMPLE 12

*1-[β-piperidinobutyryl]-indoline*

10 grams of 1-(β-hydroxybutyryl)-indoline having a melting point of 94° C. (prepared by catalytic hydrogenation of 1-acetoacetylindoline or 1-acetoacetylindole with Raney nickel as catalyst) were dissolved in 65 cc. of methylene chloride. 1 cc. of pyridine was added and then 15 grams of phosphorus tribromide were dropped in. The reaction mixture was heated for 2 hours at a bath temperature of 60° C. After cooling, the reaction mixture was poured on to ice, the methylene chloride layer was separated at once, dried with sodium sulfate and filtered. The methylene chloride solution was then concentrated whereupon 6 grams of a residue were obtained which crystallized after having been triturated with ethanol. After having been recrystallized from ethanol the 1-(β-bromobutyryl)-indoline thus obtained melted at 89 to 90° C.

3 grams of said substance were boiled for 6 hours with reflux with 20 cc. of toluene and 6 cc. of piperidine. After having been allowed to stand overnight, the salt separation that had already set in was completed by the addition of ether. The salt was filtered off with suction, the filtrate was washed once with water and extracted with 2 N hydrochloric acid. An excess of 2 N sodium hydroxide solution was added to the hydrochloric acid solution, whereupon after a short while the 1-[β-piperidinobutyryl]-indoline separated in the form of crystals. The hydrochloride of the base was obtained by adding alcoholic hydrochloric acid to the base dissolved in alcohol. It melted at 189 to 191° C. A sample of the substance did not show a melting point depression with the product obtained as described in Example 3.

EXAMPLE 13

*1-[β-diethylaminobutyryl]-indoline*

A solution of 6 grams of indoline in 10 cc. of ether was dropped at 10 to 20° C. into a solution of 4.5 grams of β-bromobutyryl chloride (prepared from β-bromobutyric acid and thionyl chloride, boiling point 55 to 60° C. under a pressure of 18 mm. of mercury) in about 50 cc. of ether. After having stirred for a short while the indoline hydrochloride was filtered off with suction, the ethereal solution was washed with a little water, dried with sodium sulfate and concentrated. 6.5 grams of a solid residue were obtained. After having recrystallized from ethanol, 5 grams of 1-[β-bromobutyryl]-indoline were obtained, having a melting point of 83 to 84° C.

4 grams of said compound were boiled for 8 hours at refluxing temperature with 20 cc. of toluene and 8 cc. of diethylamine. After having concentrated, the residue was treated with 2 N hydrochloric acid and the undissolved substance was filtered off with suction. The acid filtrate was clarified with charcoal, rendered alkaline with 2 N sodium hydroxide solution and extracted with ether. After having dried and distilled off the ether, 2 grams of an oily residue were obtained which was treated with alcoholic hydrochloric acid. The 1-[β-diethylaminobutyryl]-indoline hydrochloride thus obtained melted at 165 to 166° C. after having been recrystallized from a mixture of ethanol and ether.

We claim:

1. The compound of the formula

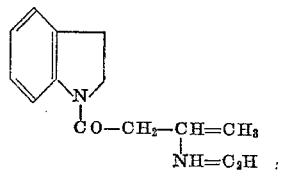

2. The compound of the formula

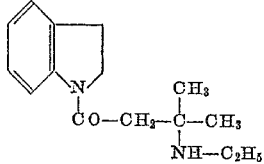

3. The compound of the formula

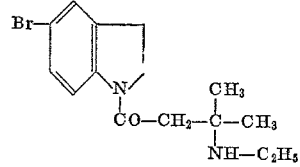

4. The compound of the formula

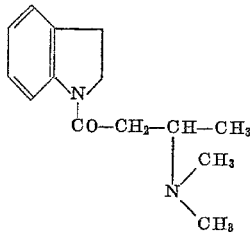

5. The compound of the formula

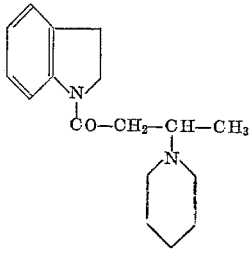

6. A compound selected from the group consisting of (1) indoline derivatives of the formula

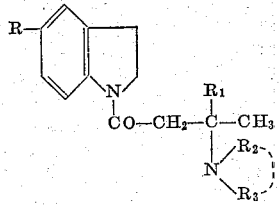

wherein R is a member selected from the group consisting of hydrogen and halogen, $R_1$ is a member selected from the group consisting of hydrogen and methyl, $R_2$ and $R_3$ are members selected from the group consisting of hydrogen and alkyl having at most four carbon atoms and, together with the nitrogen, are members selected from the group consisting of indoline, 5-halo-indoline, piperidine, pyrrolidine and morpholine; and (2) pharmaceutically acceptable acid addition salts thereof.

References Cited by the Examiner
UNITED STATES PATENTS

| | | | |
|---|---|---|---|
| 2,801,247 | 7/57 | Smith et al. | 260—294 |
| 2,852,527 | 9/58 | Steck | 260—319 |
| 2,892,753 | 6/59 | Schmidt et al. | 167—65 |
| 2,937,118 | 5/60 | Haxthausen et al. | 167—65 |

IRVING MARCUS, *Primary Examiner.*
NICHOLAS S. RIZZO, *Examiner.*